United States Patent
Chen

(10) Patent No.: US 9,857,602 B2
(45) Date of Patent: Jan. 2, 2018

(54) 3D DISPLAY APPARATUS AND 3D DISPLAY METHOD BASED ON INTEGRAL IMAGING USING LENS SWITCHING

(71) Applicant: Shenzhen China Star Optoelectronics Technology Co., Ltd., Shenzhen, Guangdong (CN)

(72) Inventor: Jianhong Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 412 days.

(21) Appl. No.: 14/426,118

(22) PCT Filed: Dec. 17, 2014

(86) PCT No.: PCT/CN2014/094084
§ 371 (c)(1),
(2) Date: Mar. 4, 2015

(87) PCT Pub. No.: WO2016/090662
PCT Pub. Date: Jun. 16, 2016

(65) Prior Publication Data
US 2016/0341970 A1    Nov. 24, 2016

(30) Foreign Application Priority Data
Dec. 10, 2014    (CN) .......................... 2014 1 0758662

(51) Int. Cl.
G02B 27/22 (2006.01)
G06F 3/147 (2006.01)
H04N 13/04 (2006.01)

(52) U.S. Cl.
CPC ......... *G02B 27/2214* (2013.01); *G02B 27/22* (2013.01); *G06F 3/147* (2013.01); *H04N 13/0404* (2013.01); *H04N 13/045* (2013.01); *H04N 13/0413* (2013.01);
(Continued)

(58) Field of Classification Search
None
See application file for complete search history.

(56) References Cited

U.S. PATENT DOCUMENTS

| | | | | |
|---|---|---|---|---|
| 2012/0194510 A1* | 8/2012 | Yun | .......................... | G02B 3/06 345/419 |
| 2014/0320551 A1* | 10/2014 | Takeda | ................ | G09G 3/3208 345/690 |
| 2015/0078033 A1* | 3/2015 | Lee | .......................... | G02F 1/01 362/609 |

* cited by examiner

*Primary Examiner* — Eileen Adams
(74) *Attorney, Agent, or Firm* — Andrew C. Cheng

(57) ABSTRACT

A 3D display apparatus and a 3D display method based on integral image using lens switching are provided. The display apparatus includes first and second display panels and a lens array. The first and second display panels synchronously display an element image and a blocking pattern respectively. The element image, the lens array and the blocking pattern are formed by periodically repeatedly arranged unit element image combinations, unit lens combinations and unit blocking pattern combinations respectively. In a frame, the unit element image combination, the unit lens combination and the unit blocking pattern combination respectively at least include two unit element images, two lenses and two unit blocking patterns. Light beams of the unit element images of the unit element image combination exit as light beams with at least two colors after passing the unit blocking pattern combination and then are mixed to be white light.

9 Claims, 8 Drawing Sheets

(52) U.S. Cl.
CPC ..... *H04N 13/0422* (2013.01); *H04N 13/0447* (2013.01); *H04N 13/0497* (2013.01); *H04N 2213/001* (2013.01)

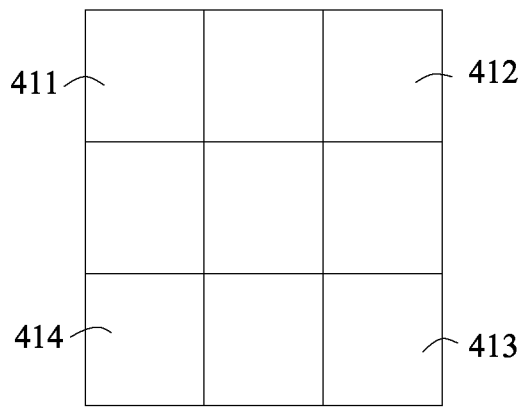
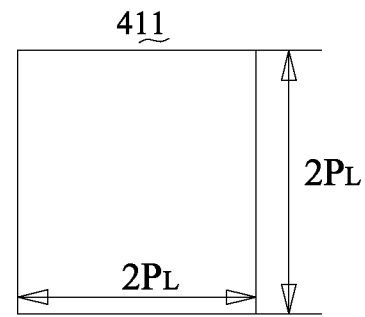
FIG. 11B
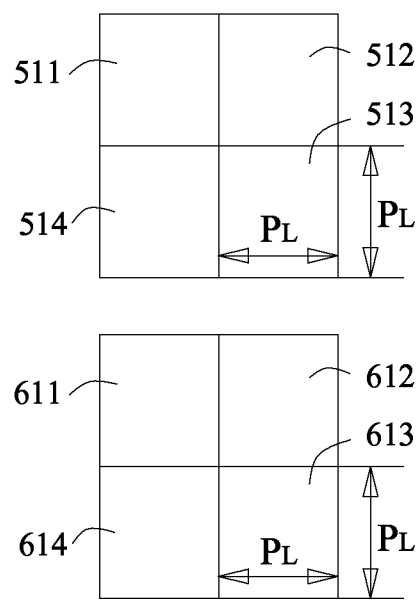
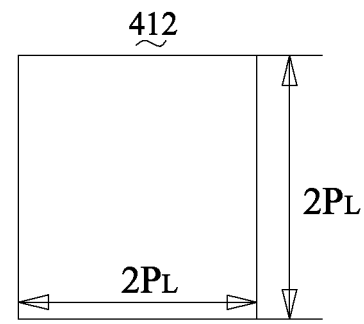
FIG. 11C
FIG. 11A
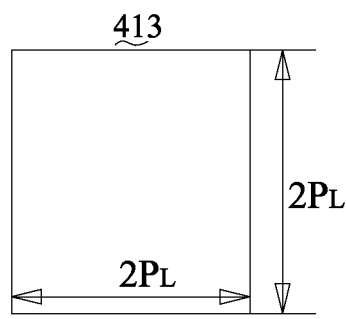
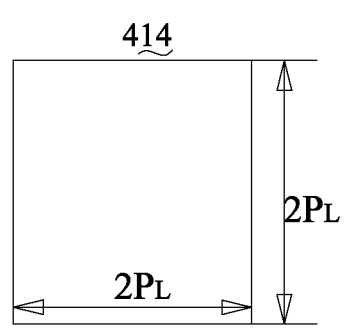
FIG. 11D          FIG. 11E

3D DISPLAY APPARATUS AND 3D DISPLAY METHOD BASED ON INTEGRAL IMAGING USING LENS SWITCHING

TECHNICAL FIELD

The invention relates to the field of 3D display technology, and particularly to a 3D display apparatus and a 3D display method based on integral imaging using lens switching.

DESCRIPTION OF RELATED ART

With the progress of digital image processing technology and equipment manufacturing level, the 3D display has become a major popular trend in display industry. A basic principle of the current 3D display is using parallax images to generate a stereo display. Two eyes of an observer respectively are made to see different images by a certain facility or technology, i.e., the left eye sees only a left-eye image and the right eye sees only a right-eye image. The left-eye image and the right-eye image are obtained by shooting a space scene from two perspectives, and when the two images are used as a stereo image, the human brain merges the two images observed by the two eyes to thereby generate a 3D effect.

Because the method of obtaining a 3D display effect by means of 3D glasses requires the user to wear a pair of 3D glasses, which would seriously affect the user experience feelings and limit the user's freedom and meanwhile cause uncomfortable to myopia and hyperopia users, and therefore the naked eye 3D display has become a more favorite choice of user.

A conventional naked eye 3D display apparatus includes a first display screen, a second display screen and a lens array. The first display screen and the second display screen synchronously display an element image and a blocking pattern respectively. The lens array includes a plurality of lenses, the blocking pattern includes graphics each being equally sized with the lens, i.e., blocking pattern units. The element image includes a plurality of element image units, the blocking pattern units and the lenses individually are disposed just opposite the element image units in one-to-one relationship. At any one selected moment, the blocking pattern is constituted by alternately arranged dark with a grayscale level of 0 and white with a grayscale level of 255, and with the lapse of time, each blocking pattern unit is switched between dark and white in a preset frequency, which makes an image of the element image unit on the first display screen corresponding to the blocking pattern unit not be viewed by the human eye when the blocking pattern unit is dark and be viewed by the human eye when the blocking pattern unit is white.

Because each blocking pattern unit is switched between dark and white, when the refresh rate is low, the image flicker viewed by the human eye is serious.

SUMMARY

A technical problem primarily to be solved by the invention is to provide a 3D display apparatus and a 3D display method based on integral imaging using lens switching, which can reduce image flicker at a predetermined refresh rate.

In order to solve the above technical problem, a technical solution proposed by the invention is to provide a 3D display apparatus based on integral imaging using lens switching.

The 3D display apparatus includes: a first display panel being a LCD panel; and a lens array and a second display panel, disposed at a side of the first display panel and arranged in parallel with the first display panel, and the second display panel being a LCD panel. The first display panel and the second display panel are configured (i.e., structured and arranged) for synchronously displaying an element image and a blocking pattern respectively. The element image, the lens array and the blocking pattern are formed by periodically repeatedly arranged unit element image combinations, unit lens combination and unit blocking pattern combinations respectively. In a frame of the 3D display apparatus: the unit element image combination includes two or four unit element images, the unit lens combination includes a plurality of lenses, the unit blocking pattern combination includes a plurality of unit blocking patterns each being equally sized with the lens, the plurality of lenses and the plurality of unit blocking patterns individually are disposed just opposite the unit element images in one-to-one relationship. The unit blocking pattern combination has colors in number same as that of the plurality of unit blocking patterns of the unit blocking pattern combination, and at a same moment, the plurality of unit blocking patterns of the unit blocking pattern combination have different colors; the colors of the plurality of unit blocking patterns of the unit blocking pattern combination take turns in every cycle; light beams of the unit element images of the unit element image combination exit as light beams with at least two colors after passing the unit blocking pattern combination and then are mixed to be white light.

In an embodiment, the unit lens combination is constituted by 2*1 number of lenses; the unit element image combination is synthesized by two unit element images each with a size of $2P_L*P_L$, where $P_L$ is a pitch of the lens; the unit blocking pattern combination is constituted by 2*1 number of unit blocking patterns each being equally sized with the lens.

In an embodiment, a pattern of the unit blocking pattern combination includes RG and B each with a grayscale level of 255, or RB and G each with a grayscale level of 255, or BG and R each with a grayscale level of 255.

In an embodiment, the unit lens combination is constituted by 2*2 number of lenses; the unit element image combination is synthesized by four unit element images each with a size of $2P_L*2P_L$, where $P_L$ is a pitch of the lens; the unit blocking pattern combination is constituted by 2*2 number of unit blocking patterns each being equally sized with the lens.

In an embodiment, a pattern of the unit blocking pattern combination includes dark, and R, G, B each with a grayscale level of 255.

In order to solve the above technical problem, another technical solution proposed by the invention is to provide a 3D display apparatus based on integral imaging using lens switching. The 3D display apparatus includes: a first display panel; and a lens array and a second display panel, disposed at a side of the first display panel and arranged in parallel with the first display panel. The first display panel and the second display panel are configured for synchronously displaying an element image and a blocking pattern respectively. The element image, the lens array and the blocking pattern are formed by periodically repeatedly arranged unit element image combinations, unit lens combinations and unit blocking pattern combinations respectively. In a frame of the 3D display apparatus: the unit element image combination at least includes two unit element images, the unit lens combination at least includes two lenses, the unit blocking pattern combination at least includes two unit blocking patterns each being equally sized with the lens, the lenses and the unit blocking patterns individually are disposed just opposite the unit element images in one-to-one relationship. The unit blocking pattern combination has colors in number same as that of the unit blocking patterns of the unit blocking pattern combination, and at a same moment, the unit blocking patterns of the unit blocking pattern combination have different colors; the colors of the unit blocking patterns of the unit blocking pattern combination take turns in every cycle; light beams of the unit element images of the unit element image combination exit as light beams with at least two colors after passing the unit blocking pattern combination and then are mixed to be white light.

In an embodiment, the unit lens combination is constituted by 2*1 number of lenses; the unit element image combination is synthesized by two unit element images each with a size of $2P_L*P_L$, where $P_L$ is a pitch of the lens; the unit blocking pattern combination is constituted by 2*1 number of unit blocking patterns each being equally sized with the lens.

In an embodiment, a pattern of the unit blocking pattern combination includes RG and B each with a grayscale level of 255, or RB and G each with a grayscale level of 255, or BG and R each with a grayscale level of 255.

In an embodiment, the unit lens combination is constituted by 2*2 number of lenses; the unit element image combination is synthesized by four unit element images each with a size of $2P_L*2P_L$, where $P_L$ is a pitch of the lens; the unit blocking pattern combination is constituted by 2*2 number of unit blocking patterns each being equally sized with the lens.

In an embodiment, a pattern of the unit blocking pattern combination includes dark, and R, G, B each with a grayscale level of 255.

In order to solve the above technical problem, still another technical solution proposed by the invention is to provide a 3D display method based on integral imaging using lens switching. The 3D display method includes: synchronously driving a first display panel and a second display panel of a display apparatus, and thereby the first display panel displaying an element image and the second display panel displaying a blocking pattern; dividing a lens array, the element image and the blocking pattern into periodically repeatedly arranged unit lens combinations, unit element image combinations and unit blocking pattern combinations respectively; in a frame of the display apparatus: the unit element image combination at least including two unit element images, the unit lens combination at least including two lenses, the unit blocking pattern combination at least including two unit blocking patterns each being equally sized with the lens, the lenses and the unit blocking patterns individually being disposed just opposite the unit element images in one-to-one relationship; the unit blocking pattern combination having colors in number same as that of the unit blocking patterns of the unit blocking pattern combination, and at a same moment, the unit blocking patterns of unit blocking pattern combination having different colors; the colors of the unit blocking patterns of the unit blocking pattern combination taking turns in every cycle; light beams of the unit element images of the unit element image combination exiting as light beams with at least two colors after passing the unit blocking pattern combination and then being mixed to be white light.

In an embodiment, the unit lens combination is constituted by 2*1 number of lenses; the unit element image combination is synthesized by two unit element images each with a size of $2P_L*P_L$, where $P_L$ is a pitch of the lens; the unit blocking pattern combination is constituted by 2*1 number of unit blocking patterns each being equally sized with the lens.

In an embodiment, a pattern of the unit blocking pattern combination includes RG and B each with a grayscale level of 255, or RB and G each with a grayscale level of 255, or BG and R each with a grayscale level of 255.

In an embodiment, the unit lens combination is constituted by 2*2 number of lenses; the unit element image combination is synthesized by four unit element images each with a size of $2P_L*2P_L$, where $P_L$ is a pitch of the lens; the unit blocking pattern combination is constituted by 2*2 number of unit blocking patterns each being equally sized with the lens.

In an embodiment, a pattern of the unit blocking pattern combination comprises dark, and R, G, B each with a grayscale level of 255.

The efficacy of the invention is that: different from the prior art, in the 3D display apparatus based on integral imaging using lens switching according to the invention, the blocking pattern displayed by the second display panel has periodically repeatedly arranged unit blocking pattern combinations, each unit blocking pattern combination at least includes two unit blocking patterns each being equally sized with the lens, the unit blocking patterns and the lenses of the lens array individually are disposed just opposite the unit element images displayed by the first display panel in one-to-one relationship; the unit blocking pattern combination has colors in number same as that of the unit blocking patterns of the unit blocking pattern combination, and at a same moment, the unit blocking patterns of the unit blocking pattern combination have different colors; the colors of the unit blocking patterns of the unit blocking pattern combination take turns in every cycle; light beams of the unit element images of the unit element image combination exit as light beams with at least two colors after passing the corresponding unit blocking pattern combination and then are mixed to be white light. Therefore, at any moment, the light beam of each unit element image only has the light ray with a color same as that of the corresponding unit blocking pattern to pass the unit blocking pattern, light rays with different colors exited from the unit blocking patterns of each unit blocking pattern combination will be mixed to be white light for output, compared with the blocking pattern only including white and dark in the prior art, the grayscale difference among the unit blocking patterns is relatively smaller, and therefore at a same refresh rate, the image flicker observed by the human eye is greatly reduced.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings:

FIG. 11A is a schematic top exploded view of a unit element image combination, a unit lens combination and a unit blocking pattern combination in a frame of the 3D display apparatus in FIG. 10;

FIG. 11B is a schematic top view of a first unit element image in the unit element image combination in FIG. 11A;

FIG. 11C is a schematic top view of a second unit element image in the unit element image combination in FIG. 11A;

FIG. 11D is a schematic top view of a third unit element image in the unit element image combination in FIG. 11A;

FIG. 11E is a schematic top view of a four unit element image in the unit element image combination in FIG. 11A;

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
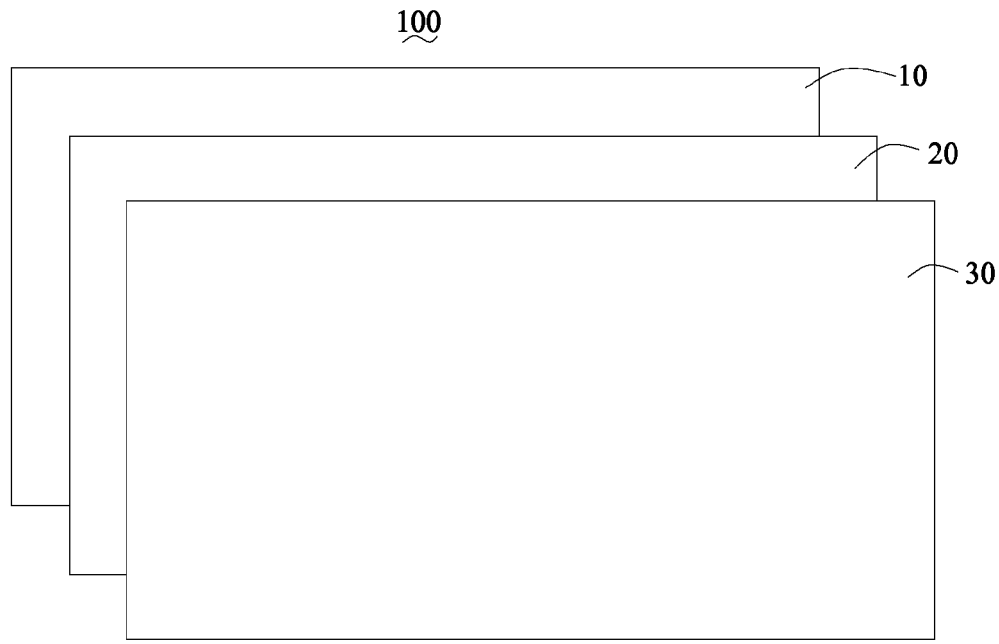
FIG. 1 is a schematic exploded view of a first embodiment of a 3D display apparatus based on integral imaging using lens switching according to the invention.
Figure 2:
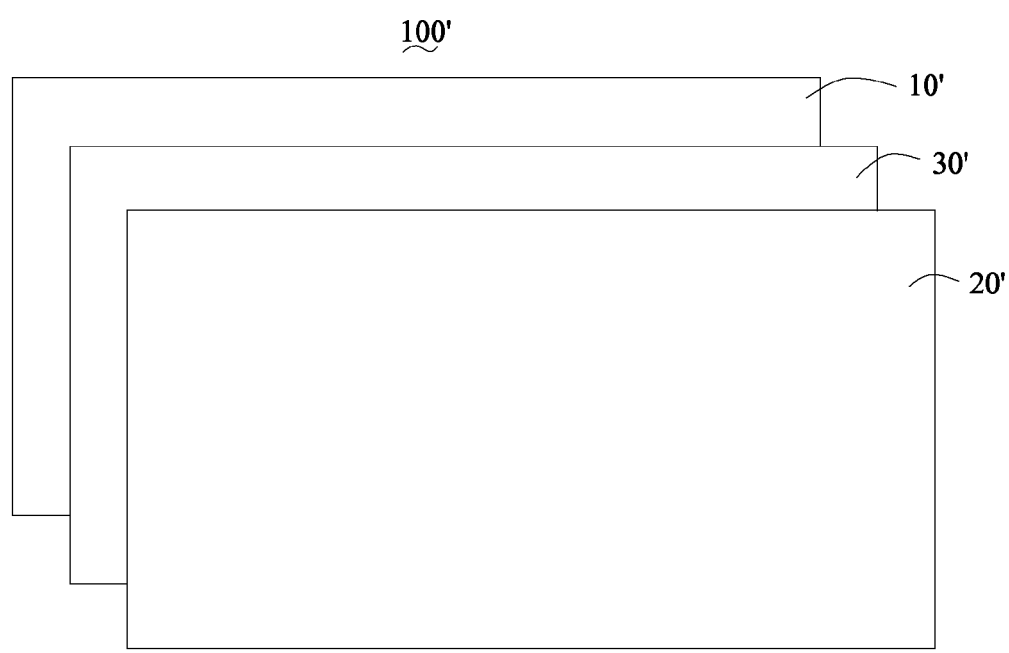
FIG. 2 is a schematic exploded view of a second embodiment of a 3D display apparatus based on integral imaging using lens switching according to the invention.
Figure 3:
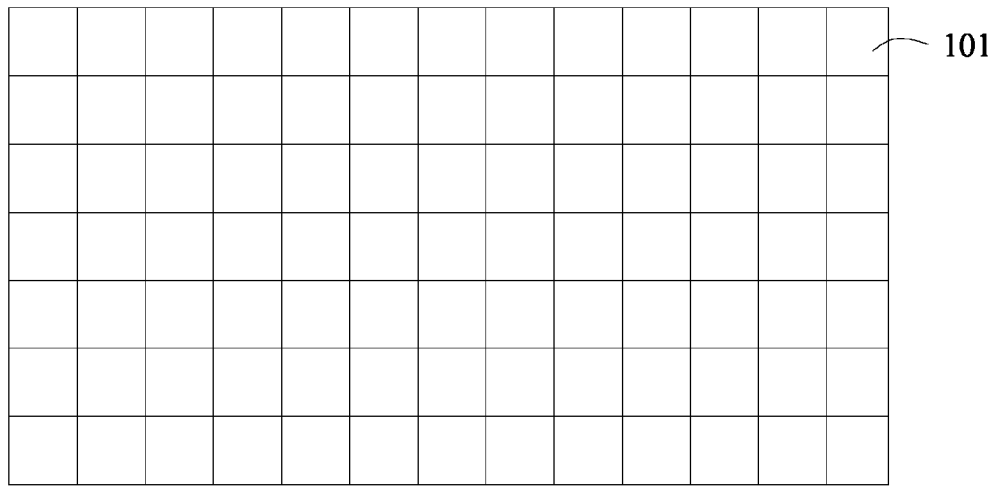
FIG. 3 is a schematic top view of a first display panel of the 3D display apparatus in FIG. 1 displaying an element image.
Figure 4:
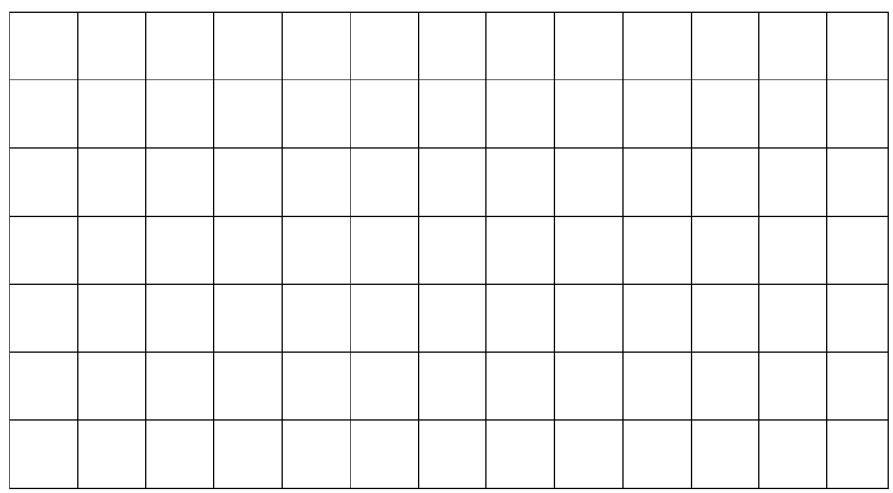
FIG. 4 is a schematic top view of a lens array of the 3D display apparatus in FIG. 1.
Figure 5:
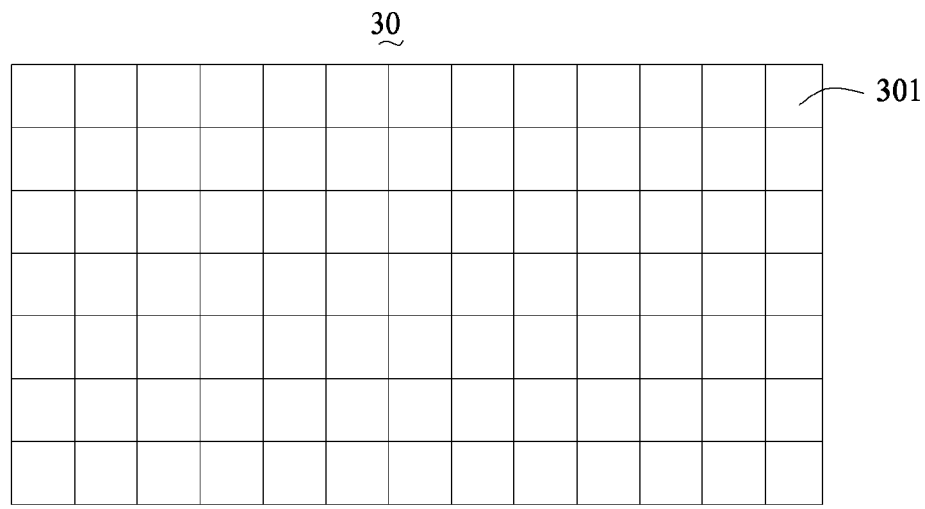
FIG. 5 is a schematic top view of a second display panel of the 3D display apparatus in FIG. 1 displaying a blocking pattern.
Figure 6A:
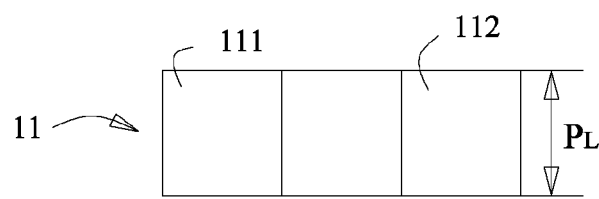
FIG. 6A is a schematic top exploded view of a unit element image combination, a unit lens combination and a unit blocking pattern combination in a frame of the 3D display apparatus in FIG. 1.
Figure 6A:
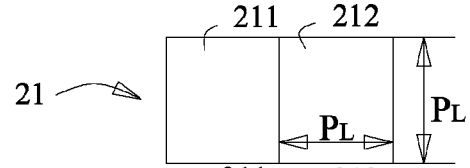
Figure 6A:
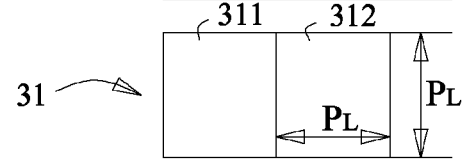
Figure 6B:
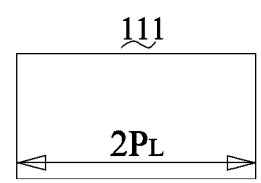
FIG. 6B is a schematic top view of a first unit element image in the unit element image combination in FIG. 6A.
Figure 6C:
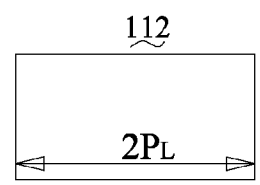
FIG. 6C is a schematic top view of a second unit element image in the unit element image combination in FIG. 6A.

Referring to FIG. 1, a 3D (three-dimensional) display apparatus 100 based on integral imaging using lens switching according to a first embodiment of the invention includes a first display panel 10, a lens array 20 and a second display panel 30. The lens array 20 and the second display panel 30 are disposed at a side of the first display panel 10 and arranged in parallel with the first display panel 10. In this embodiment, the lens array 20 is located between the first display panel 10 and the second display panel 30. In a second embodiment of the 3D display apparatus 100' as shown in FIG. 2, the second display panel 30' is disposed between the first display panel 10' and the lens array 20'.

Preferably, the first display panel 10 and the second display panel 30 both are LCD (liquid crystal display) panels.

In conjunction with FIG. 3 through FIG. 6, the first display panel 10 and the second display panel 30 synchronously display an element image 101 and a blocking pattern 301 respectively. Specifically, the element image 101, the lens array 20 and the blocking pattern 301 respectively are formed by periodically repeatedly arranged unit element image combination 11, unit lens combinations 21 and unit blocking pattern combinations 31. In other words, the element image 101, the lens array 20 and the blocking pattern 301 respectively are formed by a plurality of unit element image combinations 11, a plurality of unit lens combinations 21 and a plurality of unit blocking pattern combinations 31; the unit element image combinations 11, the unit lens combinations 21 and the unit blocking pattern combinations 31 are corresponding to one another in one-to-one relationship thereamong.

In one frame of the display apparatus 100: the unit element image combination 11 at least includes two unit element images, the unit lens combination 21 at least includes two lenses, and the unit blocking pattern combination 31 at least includes two unit blocking patterns. The lenses as well as the unit blocking patterns are disposed just opposite the unit element images in one-to-one relationship.

In this embodiment, the unit blocking pattern combination 31 is one-dimensional arrangement. The unit blocking pattern combination 31 includes a first unit blocking pattern 311 and a second unit blocking pattern 312 mutually neighboring with each other. The unit blocking pattern combination 31 has colors in number same as the number of the unit blocking patterns 311, 312 of the unit blocking pattern combination 31. At a same moment, the unit blocking patterns 311, 312 of the unit blocking pattern combination 31 have different colors, and the colors of the unit blocking patterns 311, 312 of the unit blocking pattern combination 31 take turns every cycle. In this embodiment, the unit blocking pattern combination 31 has two unit blocking patterns 311 and 312, and therefore the unit blocking pattern combination 31 has two colors, i.e., a first color and a second color; at a same moment, the unit blocking patterns 311 and 312 exhibit different colors. In one cycle, colors of the unit blocking patterns 311 and 312 respectively are switched one time, i.e., the unit blocking pattern combination 31 having two unit blocking patterns 311, 312 has two time segments in one cycle, in a first time segment, the first unit blocking pattern 311 is the first color, and the second unit blocking pattern 312 is the second color; in a second time segment, the first unit blocking pattern 311 is switched to the second color, and the second unit blocking pattern 312 is switched to the first color.

The unit lens combination 21 includes a first lens 211 and a second lens 212. The unit lens combination is constituted by 2*1 number of lenses with a size of $P_L*P_L$, where $P_L$ is a pitch of the lens. The unit blocking patterns 311, 312 each are equally sized with the lens, i.e., a size thereof also is $P_L*P_L$.

The unit element image combination 11 includes a first unit element image 111 and a second unit element image 112. The unit element images 111 and 112 each have a size of $2P_L*P_L$.

The first unit element image 111, the first lens 211 and the first unit blocking pattern 311 are disposed just opposite one another, the second unit element image 112, the second lens 212 and the second unit blocking pattern 312 also are disposed just opposite one another. Accordingly, regions of the first unit element image 111 and the second unit element image 112 have a 50% overlapped region. It can be understood that, two unit element images of neighboring two unit element image combinations 11 also have a 50% overlapped region therebetween. In one cycle, in the first time segment, a light beam of the first unit element image 111 exits as a light beam with the first color after passing the first lens 211 and the first unit blocking pattern 311, a light beam of the second unit element image 112 exits as a light beam with the second color after passing the second lens 212 and the second unit blocking pattern 312, the light beam with the first color and the light beam with the second color then are mixed to be white light; in the second time segment, the light beam of the first unit element image 111 exits as a light beam with the second color after passing the first lens 211 and the first unit blocking pattern 311, the light beam of the second unit element image 112 exits as a light beam with the first color after passing the second lens 212 and the second unit blocking pattern 312, and the light beam with the first color and the light beam with the second color then are mixed to be white light. In this embodiment, the exited light observed by the human eye always is a mixed light of two colors, and therefore, compared with the prior art, at the refresh rate of 120 Hz, the image flicker observed by the human eye is significantly reduced.

Figure 7:
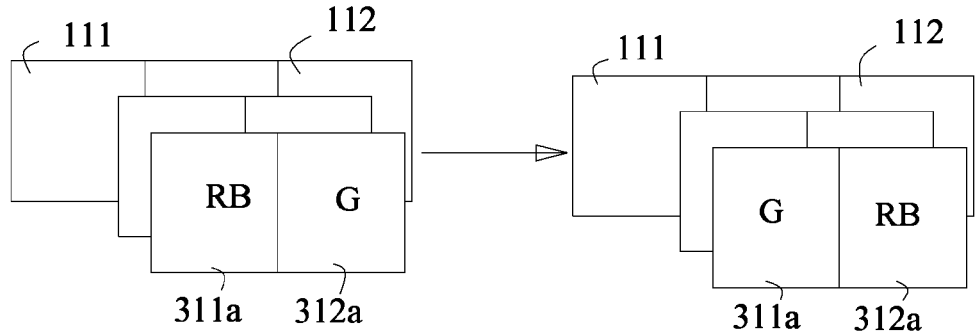
FIG. 7 is a schematic switching view in one cycle of a first concrete embodiment of the unit blocking pattern combination in a frame of the 3D display apparatus in FIG. 6A.
Figure 8:
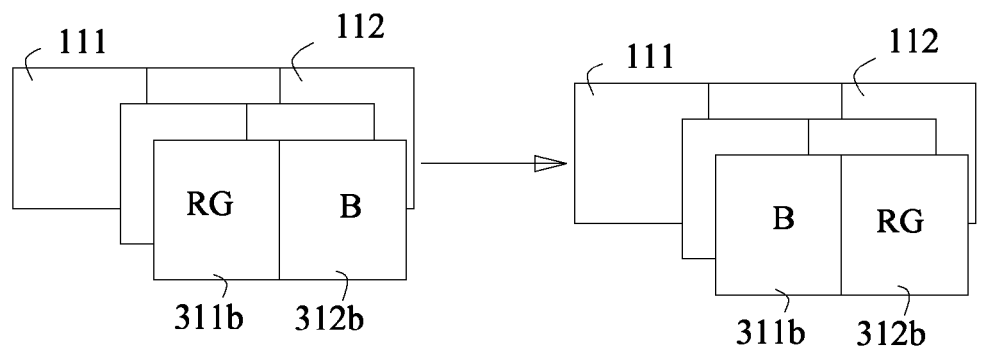
FIG. 8 is a schematic switching view in one cycle of a second concrete embodiment of the unit blocking pattern combination in a frame of the 3D display apparatus in FIG. 6A.
Figure 9:
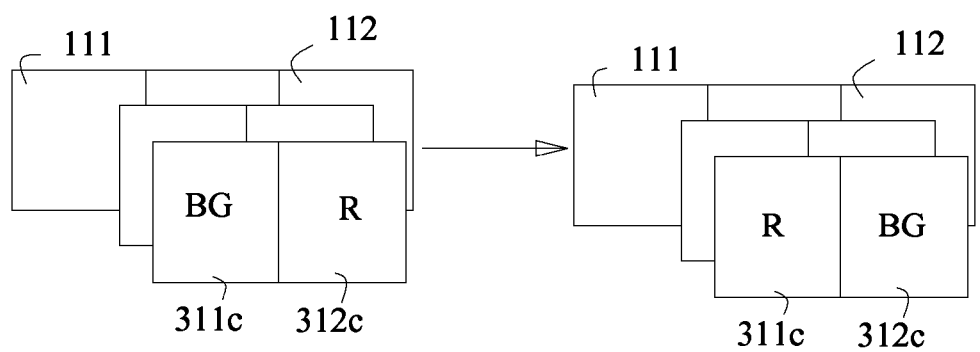
FIG. 9 is a schematic switching view in one cycle of a third concrete embodiment of the unit blocking pattern combination in a frame of the 3D display apparatus in FIG. 6A.

FIG. 7 through FIG. 9 respectively are three concrete embodiments of the unit element image combination 11 having the first unit element image 111 and the second unit element image 112. In FIG. 7, in the first time segment of one cycle, the color of the first unit blocking pattern 311a is RB (i.e., mixing of red and blue, and generally also can be called as purple) with a grayscale level of 255, the color of the second unit blocking pattern 312a is G (i.e., green) with a grayscale level of 255, and therefore at this time, the light beam of the first unit element image 111 exits as a light beam with RB color after passing the first lens 211 and the first unit blocking pattern 311a, the light beam of the second unit element image 112 exits as a light beam with G color after passing the second lens 212 and the second unit blocking pattern 312a, the two exited light beams then are observed by the human eye after being mixed to be white light; in the second time segment of the cycle, the color of the first unit blocking pattern 311a is G with a grayscale level of 255, the color of the second unit blocking pattern 312a is RB with a grayscale level of 255, and therefore at this time, the light beam of the first unit element image 111 exits as a light beam with G color after passing the first lens 211 and the first unit blocking pattern 311a, the light beam of the second unit element image 112 exits as a light beam of RB color after passing the second lens 212 and the second unit blocking pattern 312a, the two exited light beams then are observed by the human eye after being mixed to be white light. Moreover, at the refresh rate of 120 Hz, the above process takes one cycle as a unit to repeat itself.

In FIG. 8, in the first time segment of one cycle, the color of the first unit blocking pattern 311b is RG (i.e., mixing of red and green, and generally also can be called as yellow) with a grayscale level of 255, the color of the second unit blocking pattern 312b is B (i.e., blue) with a grayscale level of 255, and therefore at this time, the light beam of the first unit element image 111 exits as a light beam with RG color after passing the first lens 211 and the first unit blocking pattern 311b, the light beam of the second unit element image 112 exits as a light beam with B color after passing the second lens 212 and the second unit blocking pattern 312b, the two exited light beams then are observed by the human eye after being mixed to be white light; in the second time segment of the cycle, the color of the first unit blocking pattern 311b is B with a grayscale level of 255, the color of the second unit blocking pattern 312b is RG with a grayscale level of 255, and therefore at this time, the light beam of the first unit element image 111 exits as a light beam with B color after passing the first lens 211 and the first unit blocking pattern 311b, the light beam of the second unit element image 112 exits as a light beam with RG color after passing the second lens 212 and the second unit blocking pattern 312b, the two exited light beams then are observed by the human eye after being mixed to be white light. Moreover, at the refresh rate of 120 Hz, the above process takes one cycle as a unit to repeat itself.

In FIG. 9, in the first time segment of one cycle, the color of the first unit blocking pattern 311c is BG (i.e., mixing of blue and green, and generally also can be called as cyan) with a grayscale level of 255, the color of the second unit blocking pattern 312c is R (i.e., red) with a grayscale level of 255, and therefore at this time, the light beam of the first unit element image 111 exits as a light beam with BG color after passing the first lens 211 and the first unit blocking pattern 311c, the light beam of the second unit element image 112 exits as a light beam with R color after passing the second lens 212 and the second unit blocking pattern 312c, the two exited light beams then are observed by the human eye after being mixed to be white light; in the second time segment of the cycle, the color of the first unit blocking pattern 311c is R with a grayscale level of 255, the color of the second unit blocking pattern 312c is BG with a grayscale level of 255, and therefore at this time, the light beam of the first unit element image 111 exits as a light beam with R color after passing the first lens 211 and the first unit blocking pattern 311c, the light beam of the second unit element image 112 exits as a light beam with BG color after passing the second lens 212 and the second unit blocking pattern 312c, the two exited light beams then are observed by the human eye after being mixed to be white light. Moreover, at the refresh rate of 120 Hz, the above process takes one cycle as a unit to repeat itself.

Figure 10:
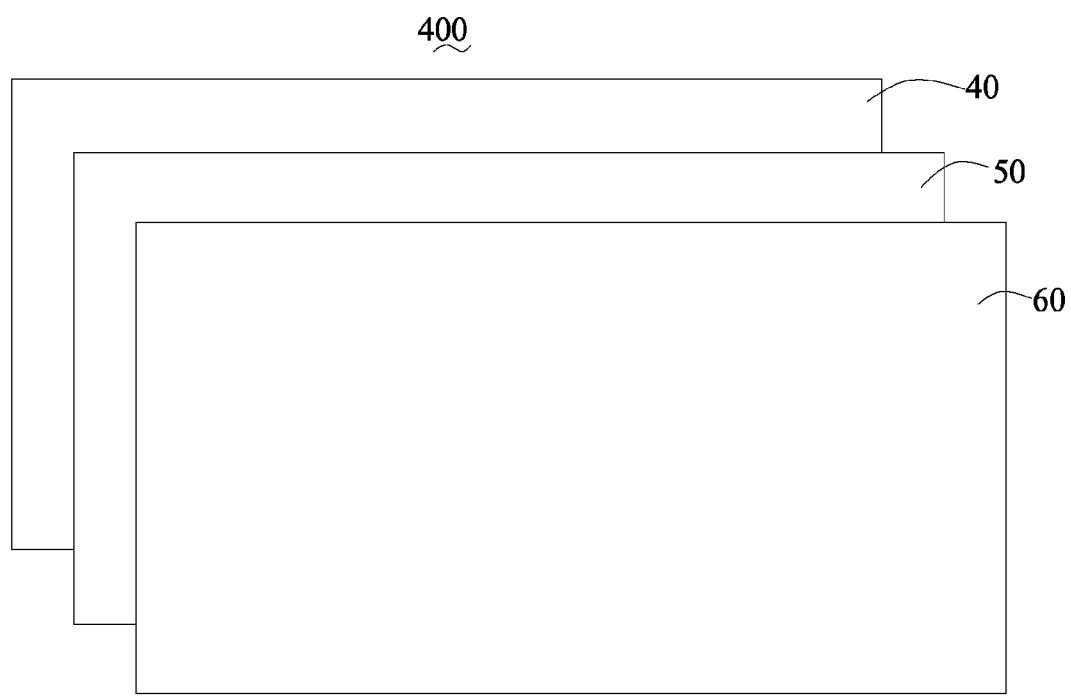
FIG. 10 is a schematic exploded view of a third embodiment of the 3D display apparatus based on integral imaging using lens switching according to the invention.

Referring to FIG. 10, the 3D display apparatus based on integral imaging by lens switching according to a third embodiment of the invention includes a first display panel 40, a lens array 50 and a second display panel 60. The lens array 50 and the second display panel 60 both are disposed at a side of the first display panel 40 and arranged in parallel with the first display panel 40. In this embodiment, the lens array 50 is located between the first display panel 40 and the second display panel 60. In other embodiment, the locations of the lens array and the second display panel are interchanged.

The first display panel 40 and the second display panel 60 synchronously display an element image and a blocking pattern respectively. The element image, the lens array 50 and the blocking pattern respectively are formed by periodically repeatedly arranged unit element image combinations 41, unit lens combinations 51 and unit blocking pattern combinations 61; the unit element image combinations 41, the unit lens combinations 51 and the unit blocking pattern combinations 61 are corresponding to one another in one-to-one relationship thereamong. Different from the one-dimensional arrangement of the unit blocking pattern combination 31 in the first embodiment, the unit blocking pattern combination 61 in this embodiment is two-dimensional arrangement.

In conjunction with FIG. 11, the unit blocking pattern combination 61 includes a first unit blocking pattern 611, a second unit blocking pattern 612, a third unit blocking pattern 613 and a fourth unit blocking pattern 614 arranged in an array of 2*2. The unit blocking pattern combination 61 has colors in number same as the number of the unit blocking patterns 611, 612, 613 and 614. At a same moment, the unit blocking patterns 611, 612, 613, 614 of the unit blocking pattern combination 61 have different colors, the colors of the unit blocking patterns 611, 612, 613, 614 of the unit blocking pattern combination 61 take turns in every cycle, and preferably, the color switching orders of the unit blocking patterns 611, 612, 613, 614 are unified.

In this embodiment, the unit blocking pattern combination 61 has four unit blocking patterns 611, 612, 613, 614, and therefore the unit blocking pattern combination 61 has four colors, i.e., a first color, a second color, a third color and a fourth color. At a same moment, the unit blocking patterns 611, 612, 613 and 614 respectively present different colors. In one cycle, the color of each of the unit blocking patterns 611, 612, 613 and 614 are switched three times, i.e., the unit blocking pattern combination 61 having the four unit blocking patterns 611, 612, 613, 614 has four time segments in one cycle, in a first time segment, the unit blocking pattern 611, 612, 613 and 614 respectively are the first color, the second color, the third color and the fourth color; in a second time segment, the unit blocking pattern 611, 612, 613 and 614 respectively are the second color, the third color, the fourth color and the first color; in a third time segment, the unit blocking pattern 611, 612, 613 and 614 respectively are the third color, the fourth color, the first color and the second color; in a fourth time segment, the unit blocking pattern 611, 612, 613 and 614 respectively are the fourth color, the first color, the second color and the third color. Preferably, the first, second, third and fourth colors respectively are R(red), G(green), B(blue) each with a grayscale level of 255 and D (dark). In other embodiment, the positions of the four colors can be arbitrarily interchanged, and even they are not limited to the listed four colors.

The unit lens combination 51 includes a first lens 511, a second lens 512, a third lens 513 and a fourth lens 514 arranged in an array of 2*2. The unit lens combination is constituted by 4 lenses each with a size of $P_L*P_L$, and where $P_L$ is a pitch of the lens. The unit blocking patterns 611, 612, 613 and 614 each are equally sized with the lens, and a size thereof also is $P_L*P_L$.

The unit element image combination 41 includes a first unit element image 411, a second unit element image 412, a third unit element image 413 and a fourth unit element image 414. The unit element images 411, 412, 413, 414 each have a size of $2P_L*2P_L$.

The first unit element image 411, the first lens 511 and the first unit blocking pattern 611 are disposed just opposite one another; the second unit element image 412, the second lens 512 and the second unit blocking pattern 612 are disposed just opposite one another; the third unit element image 413, the third lens 513 and the third unit blocking pattern 613 are disposed just opposite one another; and the fourth unit element image 414, the fourth lens 514 and the fourth unit blocking pattern 614 are disposed just opposite one another. Accordingly, regions of the first unit element image 411 and the second unit element image 412 have a 50% overlapped region, regions of the first unit element image 411 and the fourth unit element image 414 have a 50% overlapped region, regions of the second unit element image 412 and the third unit element image 413 have a 50% overlapped region, and regions of the third unit element image 413 and the fourth unit element image 414 have a 50% overlapped region. It can be understood that, the first unit element image and the second unit element image as well as the third unit element image and the fourth unit element image of neighboring two unit element image combinations 11 also have a 50% overlapped region therebetween.

Figure 12:
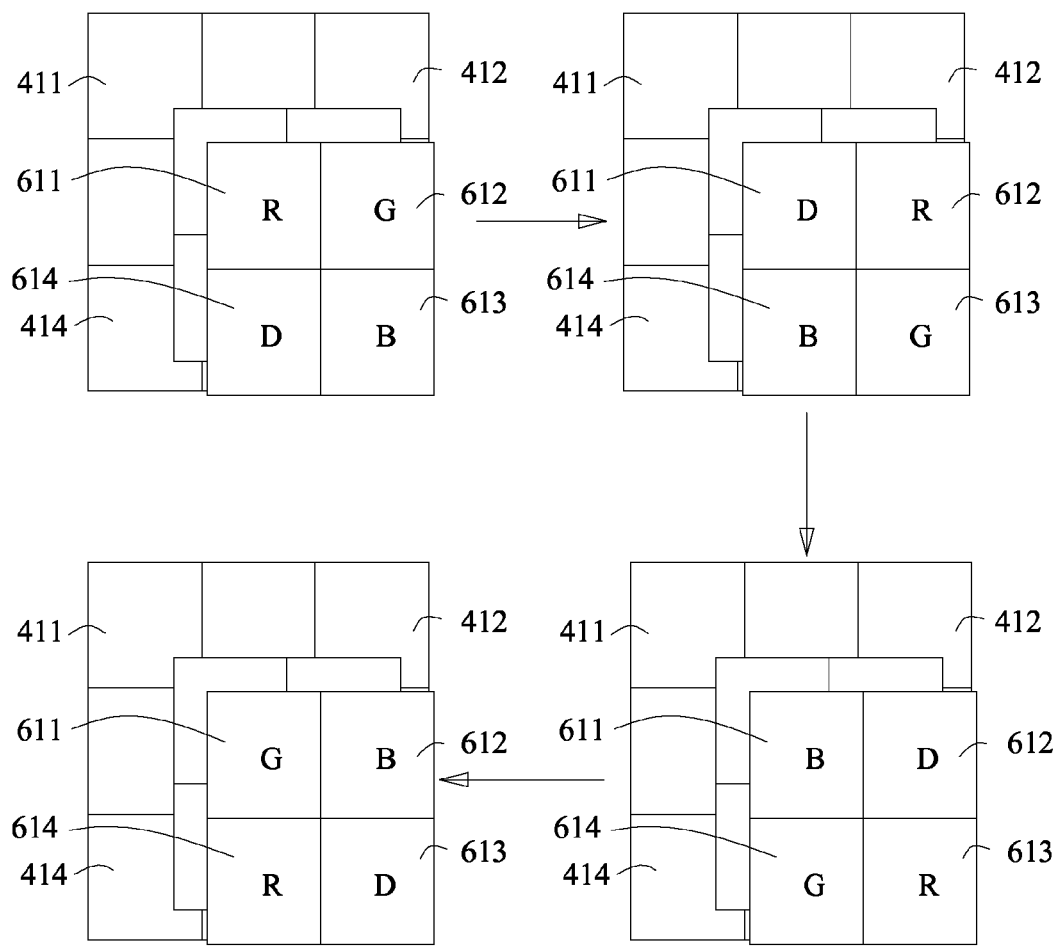
FIG. 12 is a schematic switching view in one cycle of a concrete embodiment of the unit blocking pattern combination in a frame of the 3D display apparatus in FIG. 11A.

Further referring to FIG. 12, in one cycle, in the first time segment, the colors of the unit blocking patterns 611, 612, 613, 614 respectively are R, G, B each with a grayscale level of 255, and D, a light beam of the first unit element image 411 exits as a light beam with R color after passing the first lens 511 and the first unit blocking pattern 611, a light beam of the second unit element image 412 exits as a light beam with G color after passing the second lens 512 and the second unit blocking pattern 612, a light beam of the third unit element image 413 exits as a light beam with B color after passing the third lens 513 and the third unit blocking pattern 613, a light beam of the fourth unit element image 414 is absorbed by the D color of the fourth unit blocking pattern 614, the light beams respectively with R, G, B colors then are mixed to be white light. In the second time segment, the colors of the unit blocking patterns 611, 612, 613 and 614 respectively are D, and R, G, B each with a grayscale level of 255, the light beam of the unit element image 411 is absorbed by the D color of the unit blocking pattern 611, the light beams of the unit element images 412, 413, 414 exit as light beams with R, G, B colors respectively after passing the respective unit blocking patterns 612, 613, 614 and then mixed to be white light. In the third time segment, the colors of the unit blocking patterns 611, 612, 613 and 614 respectively are B with a grayscale level of 255, D, and R, G each with a grayscale level of 255, the light beam of the unit element image 412 is absorbed by the D color of the unit blocking pattern 612, the light beams of the unit element images 413, 414, 411 exit as light beams with R, G, B colors after passing the respective unit blocking patterns 613, 614, 611 and then are mixed to be white light. In the fourth time segment, the colors of the unit blocking patterns 611, 612, 613 and 614 respectively are G and B each with a grayscale level of 255, D, and R with a grayscale level of 255, the light beam of the unit element image 413 is absorbed by the D color of the unit blocking pattern 613, the light beams of the unit element images 414, 411, 412 exit as light beams with colors R, G, B respectively after passing the respective unit blocking patterns 614, 611, 612 and then are mixed to be white light.

Sum up, in this embodiment, the exited light observed by the human eye is a mixed light of three colors, the ratio of dark blocking pattern is greatly reduced, and therefore, compared with the prior art, at the refresh rate of 240 Hz, the image flicker observed by the human eye is significantly reduced.

In the foregoing embodiments, preferably, grayscale levels of RG, RB, GB, R, G, B all are 255, and the grayscale level of D is 0.

Different from the prior art, in the 3D display apparatus 100, 400 based on integral imaging by lens switching according to the invention, the second display panel 30, 60 is for displaying the blocking pattern having periodically repeatedly arranged unit blocking pattern combination 31, 61, the unit blocking pattern combination 31, 61 at least includes two unit blocking patterns each equally sized with the lens, the unit blocking patterns as well as the lenses of the lens array 20, 50 are disposed just opposite the unit element images of the first display panel 10, 40 in one-to-one relationship; the unit blocking pattern combination 31, 61 has colors in number same as the number of its unit blocking patterns, and at a same moment, unit blocking patterns of the unit blocking pattern combination 31, 61 have different colors; the colors of the unit blocking patterns of the unit blocking pattern combination 31, 61 take turns in every cycle; light beams of the unit element images of the unit element image combination 11, 41 exit as light beams with at least two colors after passing the unit blocking pattern combination 31, 61 and then the exited light beams are mixed to be white light. Thus, at any moment, the light beam of each unit element image only has the light ray with a color same as that of the corresponding unit blocking pattern to pass the unit blocking pattern, the unit blocking patterns of each unit blocking pattern combination exit light rays with different colors respectively and then the exited light rays are mixed to be white light. Compared with the blocking pattern only including white and dark in the prior art, because the grayscale level difference among the unit blocking patterns is relatively smaller, and therefore at a same refresh rate, the image flicker observed by the human eye is greatly reduced.

Figure 13:
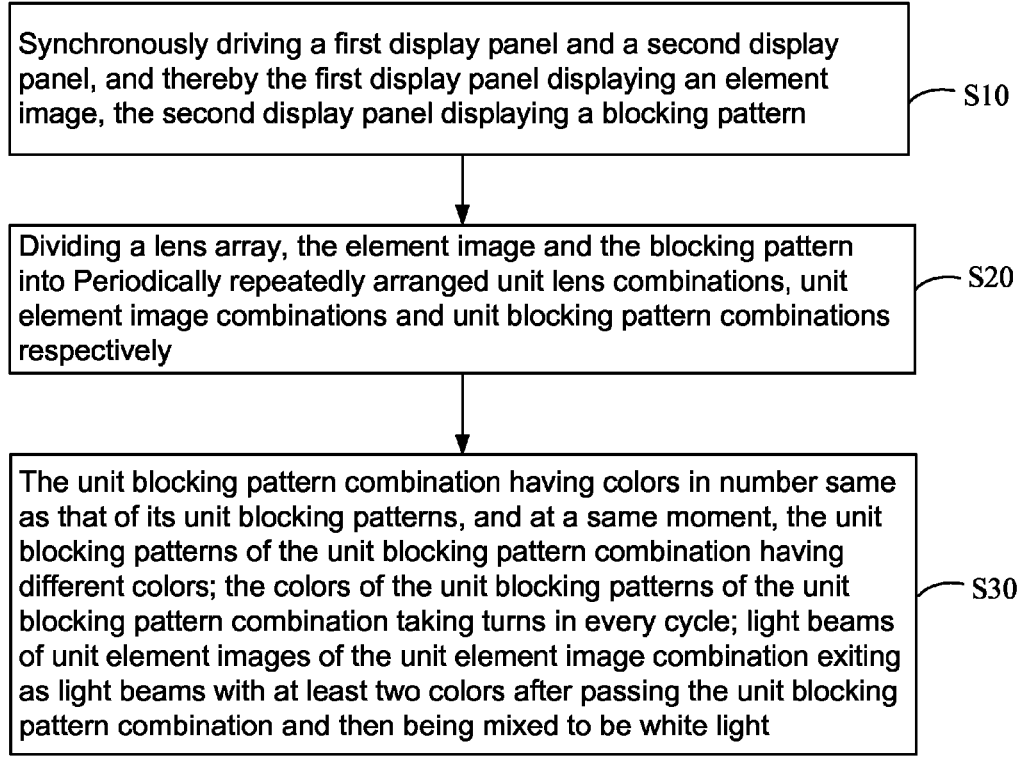
FIG. 13 is a flowchart of a 3D display method based on integral imaging using lens switching according to the invention.

In conjunction with FIG. 13, the invention further provides a 3D display method based on integral imaging using lens switching. In the foregoing embodiments of the 3D display apparatus, many introductions associated with display method has been given, and thus this section will only give a brief description to the 3D display method, a concrete implementation process of the 3D display method can be combined with the foregoing embodiments of the display apparatus. In particular, the 3D display method according to the invention includes the following steps S10, S20 and S30.

Step S10: synchronously driving a first display panel and a second display panel, and thereby the first display panel displaying an element image and the second display panel displaying a blocking pattern.

Step S20: dividing a lens array, the element image and the blocking pattern into periodically repeatedly arranged unit lens combinations, unit element image combinations and unit blocking pattern combinations respectively.

In one frame of the display apparatus: each unit element image combination at least includes two unit element images, each unit lens combination at least includes two lenses, each unit blocking pattern combination at least includes two unit blocking patterns each being equally sized with the lens, the lenses as well as the unit blocking patterns are disposed just opposite the unit element images in one-to-one relationship.

In a preferred embodiment, the unit lens combination is constituted by 2*1 number of lenses; the unit element image combination is synthesized by two unit element images each with a size of $2P_L*P_L$, where $P_L$ is a pitch of the lens; the unit blocking pattern combination is constituted by 2*1 number of unit blocking patterns each being equally sized with the lens, a pattern of the unit blocking pattern combination includes RG and B each with a grayscale level of 255, or RB and G each with a grayscale level of 255, or BG and R each with a grayscale level of 255.

In another preferred embodiment, the unit lens combination is constituted by 2*2 number of lenses; the unit element image combination is synthesized by four unit element images each with a size of $2P_L*2P_L$, where $P_L$ is a pitch of the lens; the unit blocking pattern combination is constituted by 2*2 number of unit blocking patterns each being equally sized with the lens; and a pattern of the unit blocking pattern combination includes dark, and R, G, B each with a grayscale level of 255.

Step S30: the unit blocking pattern combination having colors in number same as that of unit blocking patterns of the unit blocking pattern combination, and at a same moment, the unit blocking patterns of the unit blocking pattern combination having different colors; the colors of the unit blocking patterns of the unit blocking pattern combination taking turns in every cycle; light beams of unit element images of the unit element image combination exit as light beams with at least two colors after passing the unit blocking pattern combination and then the exited light beams being mixed to be white light.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A 3D display apparatus based on integral imaging using lens switching, the 3D display apparatus comprising:
a first display panel, wherein the first display panel is a LCD panel;
a lens array and a second display panel, disposed at a side of the first display panel and arranged in parallel with the first display panel, wherein the second display panel is a LCD panel;
the first display panel and the second display panel being configured for synchronously displaying an element image and a blocking pattern respectively;
wherein the element image, the lens array and the blocking pattern are formed by periodically repeatedly arranged unit element image combinations, unit lens combinations and unit blocking pattern combinations respectively;
wherein in a frame of the 3D display apparatus: the unit element image combination comprises two or four unit element images, the unit lens combination comprises a plurality of lenses, the unit blocking pattern combination comprises a plurality of unit blocking patterns each being equally sized with the lens, the plurality of lenses as well as the plurality of unit blocking patterns are disposed just opposite the unit element images in one-to-one relationship;
wherein the unit blocking pattern combination has colors in number same as that of the plurality of unit blocking patterns of the unit blocking pattern combination, and at a same moment, the plurality of unit blocking patterns of the unit blocking pattern combination have different colors; the colors of the plurality of unit blocking patterns of the unit blocking pattern combination take turns in every cycle; light beams of the unit element images of the unit element image combination exit as light beams with at least two colors after passing the unit blocking pattern combination and then are mixed to be white light,
wherein the unit lens combination is constituted by 2*1 number of lenses or the unit lens combination is constituted by 2*2 number of lenses,
wherein when the unit lens combination is constituted by 2*1 number of lenses, the unit element image combination is synthesized by two unit element images each with a size of 2PL*PL, where PL is a pitch of the lens, and the unit blocking pattern combination is constituted by 2*1 number of unit blocking patterns each being equally sized with the lens, wherein when the unit lens combination is constituted by 2*2 number of lenses, the unit element image combination is synthesized by four unit element images each with a size of 2PL*2PL, and the unit blocking pattern combination is constituted by 2*2 number of unit blocking patterns each being equally sized with the lens.

2. The 3D display apparatus as claimed in claim 1, wherein when the unit lens combination is constituted by 2*1 number of lenses, a pattern of the unit blocking pattern combination comprises RG and B each with a grayscale level of 255, or RB and G each with a grayscale level of 255, or BG and R each with a grayscale level of 255.

3. The 3D display apparatus as claimed in claim 1, wherein when the unit lens combination is constituted by 2*2 number of lenses, a pattern of the unit blocking pattern combination comprises dark, and R, G, B each with a grayscale level of 255.

4. A 3D display apparatus based on integral imaging using lens switching, the 3D display apparatus comprising:
   a first display panel;
   a lens array and a second display panel, disposed at a side of the first display panel and arranged in parallel with the first display panel;
   the first display panel and the second display panel being configured for synchronously displaying an element image and a blocking pattern respectively;
   wherein the element image, the lens array and the blocking pattern are formed by periodically repeatedly arranged unit element image combinations, unit lens combinations and unit blocking pattern combinations respectively;
   wherein in a frame of the 3D display apparatus: the unit element image combination at least comprises two unit element images, the unit lens combination at least comprises two lenses, the unit blocking pattern combination at least comprises two unit blocking patterns each being equally sized with the lens, the lenses as well as the unit blocking patterns are disposed just opposite the unit element images in one-to-one relationship;
   wherein the unit blocking pattern combination has colors in number same as that of the unit blocking patterns of the unit blocking pattern combination, and at a same moment, the unit blocking patterns of the unit blocking pattern combination have different colors; the colors of the unit blocking patterns of the unit blocking pattern combination take turns in every cycle; light beams of the unit element images of the unit element image combination exit as light beams with at least two colors after passing the unit blocking pattern combination and then are mixed to be white light,
   wherein the unit lens combination is constituted by 2*1 number of lenses or the unit lens combination is constituted by 2*2 number of lenses,
   wherein when the unit lens combination is constituted by 2*1 number of lenses, the unit element image combination is synthesized by two unit element images each with a size of 2PL*PL, where PL is a pitch of the lens, and the unit blocking pattern combination is constituted by 2*1 number of unit blocking patterns each being equally sized with the lens,
   wherein when the unit lens combination is constituted by 2*2 number of lenses, the unit element image combination is synthesized by four unit element images each with a size of 2PL*2PL, and the unit blocking pattern combination is constituted by 2*2 number of unit blocking patterns each being equally sized with the lens.

5. The 3D display apparatus as claimed in claim 4, wherein when the unit lens combination is constituted by 2*1 number of lenses, a pattern of the unit blocking pattern combination comprises RG and B each with a grayscale level of 255, or RB and G each with a grayscale level of 255, or BG and R each with a grayscale level of 255.

6. The 3D display apparatus as claimed in claim 4, wherein when the unit lens combination is constituted by 2*2 number of lenses, a pattern of the unit blocking pattern combination comprises dark, and R, G, B each with a grayscale level of 255.

7. A 3D display method based on integral imaging using lens switching, the 3D display method comprising:
   synchronously driving a first display panel and a second display panel of a display apparatus, and thereby the first display panel displaying an element image and the second display panel displaying a blocking pattern;
   dividing a lens array, the element image and the blocking pattern into periodically repeatedly arranged unit lens combinations, unit element image combinations and unit blocking pattern combinations respectively;
   in a frame of the display apparatus: the unit element image combination at least comprising two unit element images, the unit lens combination at least comprising two lenses, the unit blocking pattern combination at least comprising two unit blocking patterns each being equally sized with the lens, the lenses as well as the unit blocking patterns being disposed just opposite the unit element images in one-to-one relationship;
   the unit blocking pattern combination having colors in number same as that of the unit blocking patterns of the unit blocking pattern combination, and at a same moment, the unit blocking patterns of unit blocking pattern combination having different colors; the colors of the unit blocking patterns of the unit blocking pattern combination taking turns in every cycle; light beams of the unit element images of the unit element image combination exiting as light beams with at least two colors after passing the unit blocking pattern combination and then being mixed to be white light,
   wherein the unit lens combination is constituted by 2*1 number of lenses or the unit lens combination is constituted by 2*2 number of lenses,
   wherein when the unit lens combination is constituted by 2*1 number of lenses, the unit element image combination is synthesized by two unit element images each with a size of 2PL*PL, where PL is a pitch of the lens, and the unit blocking pattern combination is constituted by 2*1 number of unit blocking patterns each being equally sized with the lens,
   wherein when the unit lens combination is constituted by 2*2 number of lenses, the unit element image combination is synthesized by four unit element images each with a size of 2PL*2PL, and the unit blocking pattern combination is constituted by 2*2 number of unit blocking patterns each being equally sized with the lens.

8. The 3D display method as claimed in claim 7, wherein when the unit lens combination is constituted by 2*1 number of lenses, a pattern of the unit blocking pattern combination comprises RG and B each with a grayscale level of 255, or RB and G each with a grayscale level of 255, or BG and R each with a grayscale level of 255.

9. The 3D display method as claimed in claim 7, wherein when the unit lens combination is constituted by 2*2 number of lenses, a pattern of the unit blocking pattern combination comprises dark, and R, G, B each with a grayscale level of 255.

* * * * *